May 28, 1935.   R. G. LESTER   2,002,782
OPERA GLASS
Filed Sept. 13, 1933   2 Sheets-Sheet 1
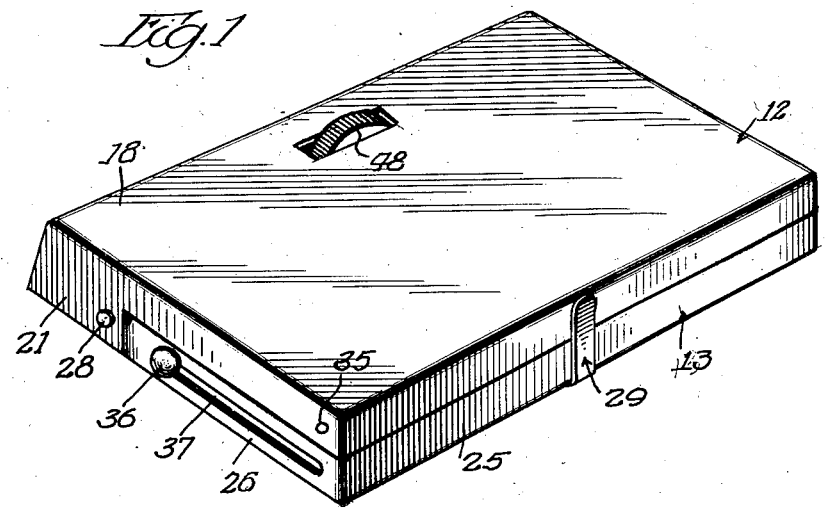
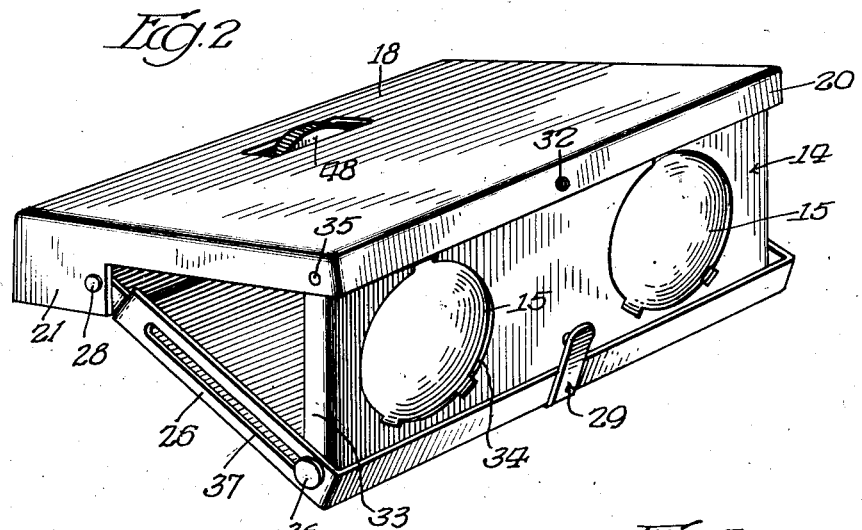
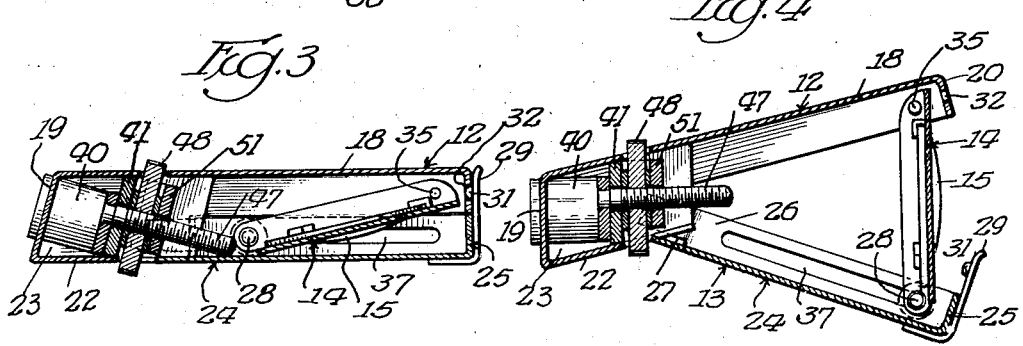

May 28, 1935.   R. G. LESTER   2,002,782
OPERA GLASS
Filed Sept. 13, 1933    2 Sheets-Sheet 2
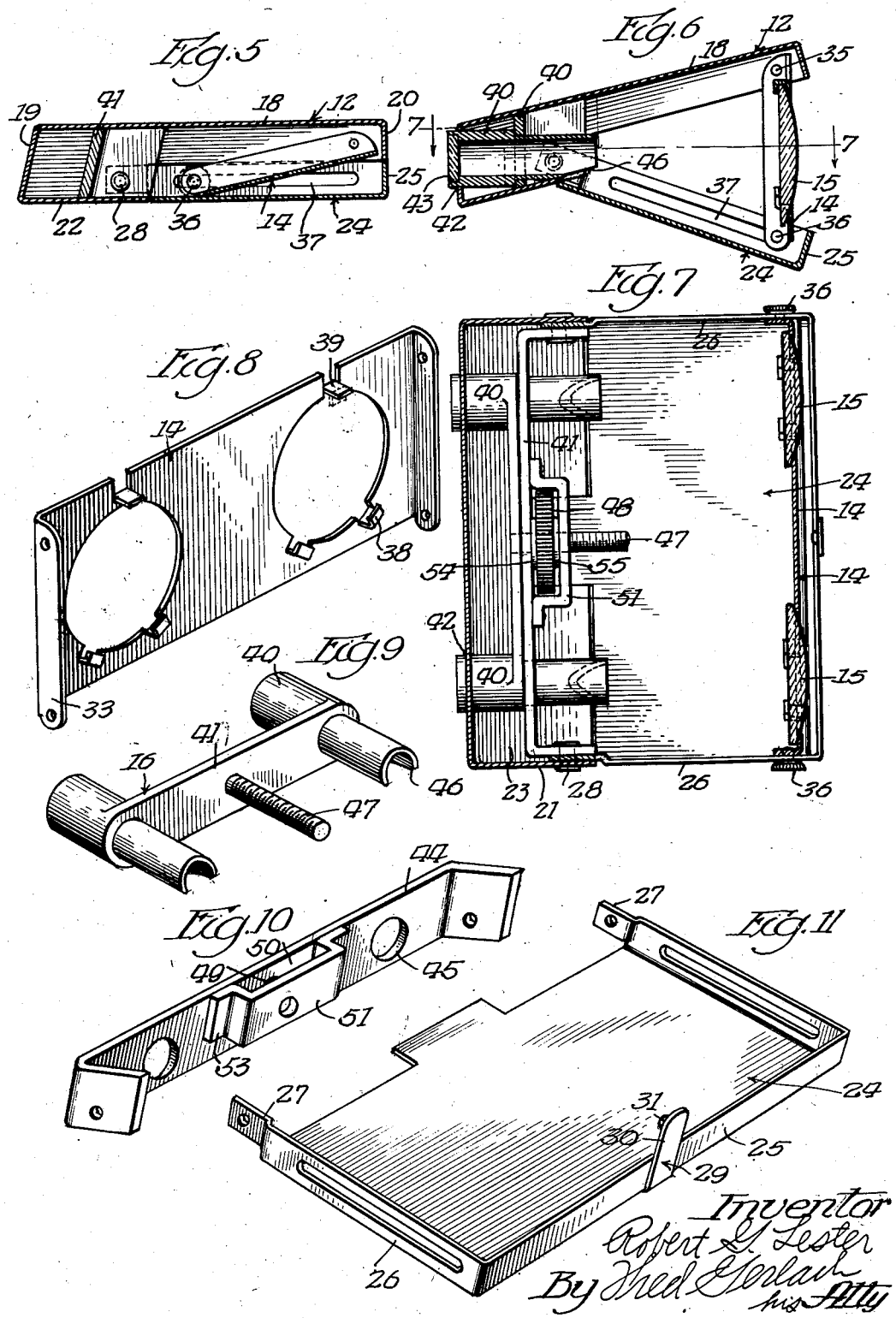

Patented May 28, 1935

2,002,782

UNITED STATES PATENT OFFICE 2,002,782

OPERA GLASS

Robert G. Lester, Chicago, Ill.

Application September 13, 1933, Serial No. 689,174

11 Claims. (Cl. 88—35)

The present invention relates generally to opera glasses. More particularly, the invention relates to that type of opera glass which is adapted to be folded or collapsed into an inoperative position for carrying or storing purposes and comprises (1) a pair of complemental casing-members which are arranged in superposed relation and are hinged together at the front ends thereof so that they may be swung to and from one another; (2) a plate which embodies a pair of laterally spaced object lenses and is pivotally mounted between the rear or distal ends of the casing-members so that it may be swung from an inoperative or folded position between the two members to an operative position wherein it extends substantially transversely of the members after the latter have been swung apart; (3) a frame which embodies a pair of laterally spaced eye lenses and is mounted adjacent to the front or proximal ends of the casing-members so that it may be moved bodily to and from the plate in order to focus the eye lenses with respect to the object lenses; and (4) mechanism for effecting adjustment of the frame with respect to the plate.

One object of the invention is to provide an opera glass of the aforementioned type in which the plate between the rear or distal ends of the two superposed, complemental casing-members is pivotally suspended from the top casing-member and is connected to the sides of the bottom casing-member by pin and slot connections so that when it is swung from its inoperative or folded position between the two members into its operative position it automatically swings the bottom casing-member away from the top member, and when it is swung from its operative position wherein it extends substantially transversely of the two members into its inoperative or folded position it operates automatically to swing the bottom casing-member into its inoperative position against the top member.

Another object of the invention is to provide an opera glass of the aforementioned type and character in which the frame having the eye lenses is mounted in a bracket which is secured fixedly to, and is disposed within, the front end of the top casing-member and is arranged so that it holds the frame in an angular or non-parallel position with respect to the top casing-member and so that the eye lenses are properly aligned and centered with respect to the object lenses when the plate between the rear or distal ends of the two casing-members is swung from its inoperative or folded position into its operative position wherein it extends transversely of the members.

A further object of the invention is to provide an opera glass which is generally an improvement upon previously designed glasses of the same general character and type, consists of but a small number of parts and may be manufactured at a low and reasonable cost.

Other objects of the invention and the various advantages and characteristics of the present opera glass construction will be apparent from a consideration of the following detailed decription.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a perspective of an opera glass embodying the invention, the casing-members of the glass being shown in their folded or collapsed position;

Figure 2 is a perspective showing the glass in its operative position, that is, in the position wherein the casing-members are swung apart and the plate with the object lenses extends transversely with respect to the casing-members;

Figure 3 is a vertical section showing in detail the construction and arrangement of the frame for the eye lenses and the mechanism for moving the frame to and from the object lenses for focusing purposes, the casing-members and plate being shown in their closed position;

Figure 4 is a vertical section showing the casing-members swung apart into their operative position and illustrating the manner in which the bracket supports the frame with the eye lenses so that the frame is angularly disposed with respect to the top casing-member and the eye lenses are centrally disposed with respect to the object lenses when the plate with the object lenses is swung into its operative position;

Figure 5 is a vertical section illustrating in detail the manner in which the two complemental casing-members are hinged together at the front ends thereof, and showing the construction and arrangement of the pin and slot connections between the plate and the bottom casing-member;

Figure 6 is a vertical section showing the construction and arrangement of the lenses of the opera glass;

Figure 7 is a horizontal section on the line 7—7 of Figure 6;

Figure 8 is a perspective of the plate which is equipped with the object lenses;

Figure 9 is a perspective of the frame for the eye lenses;

Figure 10 is a perspective of the bracket which is confined in the front end of the top casing-member and supports the frame with the eye lenses for movement to and from the object lenses; and Figure 11 is a perspective of the bottom casing-member.

The opera glass which forms the subject matter of the present invention comprises as the major parts thereof a top casing-member 12, a bottom casing-member 13, a plate 14 having a pair of object lenses 15 and a frame 16 having a pair of laterally spaced eye lenses.

The top casing-member 12 overlies the bottom member 13. It is formed from a sheet metal blank, consists of a top wall 18, a front wall 19, a rear wall 20 and a pair of side walls 21. The side walls 21 are formed integrally with and depend from the side margins of the top wall 18, as shown particularly in Figures 1 and 2 of the drawings, and are cut away at the rear lower corners thereof so as to accommodate the bottom casing-member 13. The front wall 19 is formed integrally with and depends from the front margin of the top wall 18 of the top casing-member 12, and is joined at the ends thereof to the contiguous front edges of the side walls 21. The bottom margin of the front wall 19 is provided with an extension 22 which, as shown in Figures 3, 4, 5, and 6, is bent inwardly so that it extends parallel with the top wall 18 and under the front ends of the side walls 21 and forms with the latter and the front wall 19 a compartment 23 at the front end of the top casing-member 12. The rear wall 20 is formed integrally with and depends from the rear margin of the top wall 18 and is joined at the ends thereof to the contiguous rear edges of the side walls 21.

The bottom casing-member 13 is in the nature of a complement of the top casing-member 12. It is formed from a sheet metal blank and consists of a bottom wall 24, a rear wall 25 and a pair of side walls 26. The rear wall 25 is formed integrally with and extends upwardly from the rear margin of the bottom wall 24. The side walls 26 are formed integrally with and project upwardly from the side margins of the bottom wall 24 and are joined at the rear ends thereof to the contiguous end edges of the rear wall 25. The front ends of the side walls 26 of the bottom casing-member 13 are extended to form tongues 27 which project forwardly of the front margin of the bottom wall 24. These tongues, as shown in Figure 11, are inwardly offset with respect to the side walls 26 and lap the inner faces of the front ends of the side walls 21 of the top casing-member 12. Rivets 28 extend through the tongues 27 and the front ends of the side walls of the top casing member and form with the tongues a pair of pivotal connections whereby the bottom casing-member 13 is hinged at its front end to the front end of the top casing-member 12 so that it is free to be swung to and from the top casing-member. When the two casing-members are swung together as shown in Figures 1, 3 and 5, the side walls 26 of the bottom casing-member fit within the spaces which are formed as the result of cutting away the lower rear corners of the side walls of the top casing-member. The side walls of the bottom casing-member are coplanar with the side walls of the top casing-member and the pivotal or hinge connections between the tongues 27 and the side walls of the top casing-member are such that when the two members are swung together the bottom wall 24 of the bottom casing-member 13 is coplanar with the extension 22. The rear wall 25 of the bottom casing-member fits against and is coplanar with the rear wall 20 of the top casing-member when the two members are swung together, as shown in Figures 1, 3 and 5. In order releasably to hold the two casing-members together, a latch 29 is provided. This latch consists of a spring strip 30 which is applied to the rear wall 25 of the bottom casing-member 13 and is arranged so that it overlies the top wall 20 of the rear casing-member when the two members are swung together. A stud 31 is formed on the outer or free end of the spring strip 30 and fits within a pawl 32 in the rear wall 20 of the top casing-member so as to lock the two members together. When it is desired to swing the casing-members apart, the stud is removed from the hole 32 by swinging outwardly the spring strip 30. When the casing-members are swung together, the stud 31 because of the action of the spring strip 30, snaps into the hole 32 and thus effects a secure locking together of the two casing-members.

The plate 14 which carries or is equipped with the object lenses 15 is formed from a rectangular blank of sheet metal and is provided with integral, inturned flanges 33 at the ends thereof. It embodies a pair of laterally spaced, circular apertures 34 for the object lenses 15 and is pivotally suspended from the rear end of the top casing-member 12 by pivot pins 35. The latter extend through the rear ends of the side walls 21 of the casing-member and the upper ends of the inturned flanges 33 at the ends of the plate 14 and permit the plate to be swung from an operative position wherein it extends transversely with respect to the casing-members into a folded or inoperative position wherein it is disposed between the two members. The lower ends of the inturned flanges 33 are provided with outwardly extending pins 36. The latter extend through and slide longitudinally in elongated slots 37 in the side walls 26 of the bottom casing-member 13 and coact with the slots so as to cause automatically the bottom casing-member to be swung away from the top casing-member, and also to cause the bottom casing-member to be swung automatically towards the top casing-member when the plate is swung into its folded or inoperative position under the rear end of the top casing-member. The outer ends of the pins 36 are preferably in the form of knobs so that they may be gripped by the user of the opera glass in connection with swinging the plate 14 into and out of its operative position. The object lenses 15 are of slightly larger diameter than the apertures 34 and are held in place against the front face of the plate 14 and in registry with the apertures 34 by bottom tongues 38 and top tongues 39. The bottom tongues 38 are formed integrally with the portions of the plate 14 which define the lower parts of the apertures 34, and underlie and support the bottom portions of the object lenses 15. The top tongues 39 are cut from the upper margin of the plate 14 and are bent around the front upper portions of the object lenses 15 so as to hold them in a seated position with respect to the apertures 34. There are preferably two of the bottom tongues 38 for each object lens and but a single top tongue 39 is needed for each lens. By employing the tongues 38 and 39, the object lenses are held in seated relation with the apertures 34 in a simple and inexpensive manner.

The frame 16 which carries or is equipped with the eye lenses 17 is located in the compartment 23. It is preferably in the nature or form of a die casting and consists of a pair of lens-retaining barrels 40 and a crossbar 41. The crossbar extends between and is formed integrally with the central portions of the barrels and serves to hold the barrels in laterally spaced relation. The portions of the barrels in front of the crossbar 41 are preferably larger than the portions in back of or at the rear of the crossbar. They are cylindrical in form and extend through circular apertures 42 in the front wall 19 of the top casing-member 12. The extreme front ends of the barrels are recessed or bored to form annular seats 43 for the eye lenses 17. The latter are staked, cemented or otherwise secured in the seats and are adapted to be aligned with the object lenses 15 when the plate 14 is swung into its operative position. The barrels 40 are hollow, as shown in Figure 6. The frame 16 is supported by a bracket 44 so that it is movable bodily to and from the plate 14 in order that the eye lenses 17 may be brought into focus with the object lenses 15. The bracket 44 is formed from a strip of metal and extends transversely across the central portion of the compartment 23 in the front end of the top casing-member 12. The ends of the bracket are bent so that they extend rearwardly at right angles to the central portion of the bracket and are secured to the side walls 21 of the top casing-member by means of the rivets 28. The central portion of the bracket is provided with a pair of apertures 45. These apertures are aligned with the apertures 42 in the front wall 19 of the casing-member and receive slidably the rear portions of the lens-retaining barrels 40. By virtue of the fact that the front portions of the barrels 40 extend through the circular apertures 42 in the front wall 19 of the top casing-member and the rear portions of the barrels are mounted slidably in the circular apertures 45 in the central portion of the bracket 44, the frame 16 is mounted so that it is shiftable bodily to and from the plate 14 for focusing purposes. The bent ends of the bracket 44 are arranged so that the central portion of the bracket is held at such an angle with respect to the top wall 18 of the top casing-member 12 that the lens-retaining barrels 40 of the frame 16 are centered and aligned with the object lenses 15 when the plate 14 is in its operative position. The front wall 19 of the top casing-member extends parallel with the central portion of the bracket 44 with the result that the barrels 40 extend at right angles thereto. Because the frame 16 is held by the bracket in an angular position with respect to the top wall 18 of the top casing-member instead of parallel with the top wall, the rear portions of the barrels 40 are cut away on the under portions thereof as at 46 in order to fit against the extension 22 of the front wall of the top casing-member.

In addition to the top and bottom casing-members, the plate 14, the frame 16 and the bracket 44, the opera glass comprises mechanism for adjusting the frame 16 to and from the plate 14. This mechanism consists of a screw 47 and a nut 48. The screw 47 is secured fixedly to and projects rearwardly from the central portion of the crossbar 41 of the frame 16 and extends through a hole 49 in the central portion of the bracket 44. The nut 48 is mounted on the screw 47 and is located in a pocket 50 which is formed between the rear face of the central portion of the bracket 44 and a U-shaped metal strip 51. The legs of this strip are provided with outturned flanges 53 which are spot welded to the central portion of the bracket 44. A washer 54 fits between the nut 48 and the rear face of the bracket 44 and a washer 55 fits between the nut and the strip 51. These washers are mounted on the screw 47 and serve to hold the nut 48 against axial displacement in the pocket 50. The top wall 18 and extension 22 of the top casing-member 12 are slotted so that the nut 48 is accessible from the outside of the casing-member. When the nut is turned in one direction, the frame 16 is shifted away from the plate 14 and when the nut is rotated in the opposite direction, the frame is shifted towards the plate 14. By turning the nut, the frame may be adjusted in order to bring the eye lenses 17 into focus with the object lenses 15 on the plate 14.

When the opera glass is to be used, the spring strip 30 of the latch 29 is swung outwardly so as to withdraw the stud 31 from the pawl 32 in the rear wall 20 of the top casing-member 12. Thereafter, the plate 14 is swung downwardly from its folded or collapsed position under the top casing-member 12 until it is arrested as the result of the pins 36 striking against the rear ends of the slots 37. As the plate 14 is swung downwardly, the bottom casing-member 13 is automatically swung away from the top casing-member in response to the action of the pin and slot connections between the plate and the bottom casing-member. When the plate 14 is in its operative position, the glass may be used by looking through the eye lenses 17 in the barrels 40 of the frame 16. In the event that the eye lenses are not properly focused, an adjustment may be effected by manipulation of the nut 48. When it is desired to collapse the glass, the plate 14 is swung upwardly under the top casing-member 12 into its inoperative position. During upward swinging movement of the plate 14, the bottom casing-member 13 is swung upwardly against the rear end of the top casing member in response to the action of the pin and slot connections between the plate 14 and the side walls 26 of the bottom casing-member.

The herein disclosed opera glass consists of but a small number of parts and may be manufactured at a low and reasonable cost. It is extremely compact and when in its folded or collapsed position, occupies but a small space.

Whereas the glass has been defined as an opera glass, it is to be understood that it may be used as a field glass and for different purposes. It is also to be understood that the invention is not to be restricted to the details set forth, since these may be modified within the scope of the appended claims, without departing from the spirit and scope of the invention.

Having thus described the invention, what I claim as new and desire to secure by Letters Patent, is:

1. An opera glass of the character described, comprising in combination a pair of complemental casing-members arranged in superposed relation and hinged together at the front ends thereof so that they may be swung to and from one another, a plate with objective lenses mounted thereon connected pivotally to the rear end of one of the casing-members and adapted to be swung from a folded position between the two members into an operative position wherein it extends substantially transversely of the members and vice versa, a pin and slot connection between the plate and the other casing-member whereby said other casing-member is caused automatically to be swung away from said one casing-member when the plate is swung into its operative position and is also caused automatically to be swung towards said one casing-member when the plate is swung into its folded position, and eye lenses at the front ends of the casing-members arranged so that they are aligned and centered with the object lenses when the plate is in its operative position.

2. An opera glass of the character described, comprising in combination a pair of complemental, superposed casing-members provided with side walls and hinged together at the front ends thereof so that they may be swung to and from one another, a plate with objective lenses mounted thereon connected pivotally to the rear ends of the side walls of one of the casing-members and adapted to be swung from a folded position between the two casing-members into an operative position wherein it extends substantially transversely of the two members and vice versa, pin and slot connections between the plate and the side walls of the other casing-member whereby said other casing-member is caused automatically to be swung away from said one casing-member when the plate is swung into its operative position and is also caused automatically to be swung towards the one member into a closed position when the plate is swung into its folded position, and eye lenses at the front ends of the casing-members arranged so that they are aligned and centered with the object lenses when the plate is in its operative position.

3. An opera glass of the character described, comprising in combination a pair of complemental casing-members arranged in superposed relation and hinged together at the front ends thereof so that they may be swung to and from one another, one of said members being provided with side walls having elongated slots therein, a plate with objective lenses mounted thereon connected pivotally to the rear end of the other casing member and adapted to be swung from a folded position between the casing members into an operative position wherein it extends substantially transversely of the two members and vice versa, studs on the plate extending through and slidable in the slots in the side walls of said one casing-member and forming with said slots connections whereby said one casing-member is caused automatically to be swung away from the other casing-member when the plate is swung into its operative position and is also caused to be swung automatically towards said other casing-member into a closed position when the plate is swung into its folded position, and eye lenses at the front ends of the casing-members arranged so that they are aligned and centered with the object lenses when the plate is in its operative position.

4. An opera glass of the character described, comprising in combination a pair of complemental, superposed casing-members provided with side walls and hinged together at the front ends thereof so that they may be swung to and from one another, a plate with objective lenses mounted thereon suspended pivotally from the rear ends of the side walls of the top casing-member and adapted to be swung from a folded position between the casing-members into an operative position wherein it extends substantially transversely of the two members and vice versa, outwardly extending studs on the distal portion of the plate extending through and slidable in elongated slots in the side walls of the other casing-member and forming with the slots connections whereby the bottom casing-member is caused automatically to be swung away from the top casing-member when the plate is swung into its operative position and is also caused automatically to be swung towards the top member and into a closed position when the plate is swung into its folded position, and eye lenses at the front ends of the casing-members arranged so that they are aligned and centered with the object lenses when the plate is in its operative position.

5. An opera glass of the character described, comprising in combination a pair of superposed casing-members, one of said members having rigid therewith a front wall with a pair of laterally spaced apertures therein and the other member being in the form of a complement and hinged at its front end to the front end of the one member so that it is free to swing to and from the latter, a plate with a pair of objective lenses supported in laterally spaced relation thereon mounted pivotally between the rear ends of the casing-members and adapted upon swinging apart of said members to be swung from a folded or collapsed position between the members into an operative position wherein it extends at slightly less than right angles to said members, a frame disposed adjacent the front ends of the casing-members and embodying a pair of barrels provided with eye lenses therein and having the front ends thereof extending through the apertures in said front wall, and means fixedly connected to said one casing member and arranged to support the frame so that it is shiftable to and from the plate for focusing purposes and so that the barrels thereof are disposed at all times at such a constant or fixed acute angle with respect to said one casing member that the eye lenses are aligned and centered with the object lenses respectively when the plate is in its operative position.

6. An opera glass of the character described, comprising in combination a pair of superposed casing-members, one of said members having rigid therewith a front wall with a pair of laterally spaced apertures therein and the other member being in the form of a complement and hinged at its front end to the front end of the one member so that it is free to swing to and from the latter, a plate with a pair of objective lenses supported in laterally spaced relation thereon mounted pivotally between the rear ends of the casing-members and adapted upon swinging apart of said members to be swung from a folded or collapsed position between the members into an operative position wherein it extends at slightly less than right angles to said members, a frame disposed adjacent the front ends of the casing members and embodying a crossbar directly behind the aforesaid front wall and a pair of lens-equipped barrels mounted on the crossbar and having the front ends thereof extending through the apertures in said front wall, and a bracket connected fixedly to said one casing-member and arranged to support the frame so that it is shiftable to and from the plate for focusing purposes and so that the barrels thereof are disposed at all times at such a constant or fixed acute angle with respect to said one casing member that the lenses therein are aligned and centered with the object lenses respectively when the plate is in its operative position.

7. An opera glass of the character described, comprising in combination a pair of superposed casing-members, one of said members having rigid therewith a pair of side walls and a front wall with a pair of laterally spaced apertures therein and the other member being in the form of a complement and hinged at its front end to the front end of the one member so that it is free to swing to and from the latter, a plate with a pair of objective lenses supported in laterally spaced relation thereon mounted pivotally between the rear ends of the casing-members and adapted upon swinging apart of said members to be swung from a folded or collapsed position between the members into an operative position wherein it extends at slightly less than right angles to said members, a frame disposed adjacent to the front ends of the casing-members and comprising a crossbar in back of the aforementioned front wall and a pair of lens-equipped barrels mounted on the crossbar and having the front ends thereof extending through the apertures in said front wall, and a bracket having end parts connected fixedly to the side walls of said one casing member and also having a pair of apertures therein aligned respectively with the apertures in the front wall and arranged to receive slidably the rear ends of the barrels respectively and in such relation with respect to the apertures in the front wall that the frame is supported to slide bodily to and from the plate for lens-focusing purposes and the barrels are disposed at all times at such a constant or fixed acute angle with respect to said one casing member that the lenses in the barrels are aligned and centered with the object lenses of the plate when the latter is in its operative position.

8. An opera glass of the character described, comprising in combination a pair of superposed, sheet metal casing members, one of said members having the front end thereof bent downwardly to form a front wall and then inwardly to form an extension adjacent the front wall and the other member being in the form of a complement and hinged at its front end to the front end of said one casing-member so that it is free to swing to and from the latter, a plate with a pair of objective lenses supported thereon mounted pivotally between the rear ends of the casing-members and adapted upon swinging apart of said members to be swung from a folded or collapsed position between the members into an operative position wherein it extends at slightly less than right angles to said members, a frame confined in the front end of said one casing-member by the front wall and extension and comprising a crossbar positioned in back of said front wall and a pair of lens-equipped barrels mounted on the crossbar and having the front ends thereof extending through apertures in said front wall, and a fixedly mounted bracket confined in the front end of said one casing-member together with the frame and arranged to support the frame so that it is shiftable bodily to and from the plate for focusing purposes and the barrels are disposed at all times at such a constant fixed acute angle with respect to said one casing member that the lenses therein are aligned and centered with the object lenses when the plate is in its operative position.

9. An opera glass of the character described comprising in combination a pair of complemental casing-members arranged in superposed relation and hinged together at the front ends thereof so that they may be swung to and from one another, a plate with a pair of object lenses supported in laterally spaced relation thereon mounted pivotally between the rear ends of the casing-members and adapted upon swinging apart of said members to be swung from a folded or collapsed position between the members into an operative position wherein it extends at slightly less than right angles to said members, a front wall having a pair of laterally spaced apertures therein and connected rigidly to the front end of one of said members and at such an angle relatively to the latter that it extends parallel to the plate when the latter is in its operative position, and a pair of eye lenses associated with the aforesaid apertures respectively and held in such a fixed angular position with respect to said one casing-member that they are aligned and centered with the object lenses respectively when the plate is in its aforesaid operative position.

10. An opera glass of the character described comprising in combination a pair of complemental casing-members arranged in superposed relation and hinged together at the front ends thereof so that they may be swung to and from one another, a plate with object lenses supported thereon in laterally spaced relation mounted pivotally between the rear ends of the casing-members and adapted upon swinging apart of said members to be swung from a folded or collapsed position between the members into an operative position wherein it extends at slightly less than right angles to said members, a front wall having a pair of laterally spaced apertures therein and connected rigidly to the front end of one of said members and at such an angle relatively to the latter that it extends parallel to the plate when the latter is in its operative position, a frame disposed adjacent the front ends of the casing-members embodying a pair of barrels provided with eye lenses therein and having the front ends thereof extending through the apertures in said front wall, and means secured fixedly to said one casing-member and arranged to support the frame so that it is shiftable to and from the plate for focusing purposes and the barrels thereof are disposed at all times at such a constant or fixed acute angle with respect to said one casing-member that the eye lenses are aligned and centered with the object lenses respectively when the plate is in its operative position.

11. An opera glass of the character described comprising in combination a pair of superposed casing-members, one of said members having at the front end thereof a rigid front wall with an inwardly extending extension and the other member being in the form of a complement and hinged at its front end to the front end of the said one casing-member so that it is free to swing to and from the latter, a plate with a pair of object lenses supported thereon mounted pivotally between the rear ends of the casing-members and adapted upon swinging apart of said members to be swung from a folded or collapsed position between the members into an operative position wherein it extends at slightly less than right angles to said members, a frame confined in the front end of said one casing-member between the front wall and extension and embodying a pair of lens-equipped barrels having the front ends thereof extending slidably through apertures in said front wall, and a fixedly mounted bracket also confined in the front end of said one casing-member between the front wall and extension and arranged to support the frame so that it is shiftable bodily to and from the plate for focusing purposes and the barrels are disposed at all times at such a constant or fixed acute angle with respect to said one casing-member that the lenses therein are aligned and centered with the object lenses when the plate is in its operative position.

ROBERT G. LESTER.